July 12, 1966 G. C. DELLA PERGOLA ET AL 3,260,625

ELECTRON BEAM METHOD FOR MAKING CONTACTS AND P-N JUNCTIONS

Filed June 25, 1963

WITNESSES:
Bernard R. Giegner
James F. Young

INVENTORS
Gian C. Della Pergola &
Samuel A. Zeitman.
BY
C. L. Menzemer
ATTORNEY

United States Patent Office 3,260,625

Patented July 12, 1966

3,260,625
ELECTRON BEAM METHOD FOR MAKING CONTACTS AND P-N JUNCTIONS

Gian C. Della Pergola, Naples, Italy, and Samuel A. Zeitman, Pittsburgh, Pa., assignors to Westinghouse Electric Corporation, Pittsburgh, Pa., a corporation of Pennsylvania Filed June 25, 1963, Ser. No. 290,376
6 Claims. (Cl. 148—179)

This invention relates to the preparation of ohmic contacts and p-n junctions in semiconductors.

In microminiaturization of semiconductor structures, particular problems are encountered in producing junctions, contacts and the like in view of the extremely small size of the functional areas. For similar reasons, the preparation of an unusual shape for an ohmic contact or an area associated with a p-n junction is very difficult and expensive to achieve with presently available techniques.

An object of the present invention is to provide a process whereby ohmic contacts and p-n junctions of good definition, and which may be of complicated shape, can be provided in a semiconductor body.

Other objects of the invention will be apparent from the following detailed description, discussion and drawing, in which.

Figure 1:
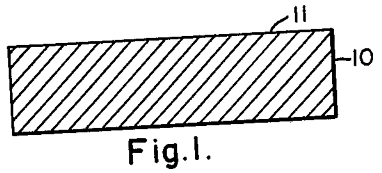
FIG. 1 is a side view of a section of a wafer of semiconductive material used in preparing a semiconductor device in accordance with the present invention.

It should be understood that the drawing is adapted to provide visual clarity and is not intended to be to any scale.

The present invention is based upon our discovery that upon the controlled application of an electron beam to melt metal on a surface of a semiconductive material, a localized metal area melts and interfacial tensions cause the molten area to assume partial sphericity, in effect to "ball up." The metal should have a melting point below that of the semiconductor material used. At these conditions, metal to which such an electron beam is applied tends to migrate from contact with the electron beam thereby clearing the surface of the semiconductive material where the electron beam has been applied. The metal migrating or withdrawing from the areas treated builds up around those areas to a level greater than the original metal deposit. While we do not desire to be limited by theoretical considerations, it is our belief that this tendency to migrate and to assume partial spherical or cylindrical form is largely attributable to surface tension forces in the molten metal. In any event, the result achieved by novel technique as described herein constitutes a metal source disposed in many unique and useful ways that can be alloyed to the semiconductive body and thereby result in a junction or an ohmic contact, depending on the particular conductivity characteristics of the semiconductive material and the metal.

In accordance with the present invention, the foregoing observation is utilized as follows: a conductivity determining material is applied to the surface of a body of semiconductive material. Portions of the conductivity determining impurity can then be removed with a view to leaving the desired size and shape of that material where desired. This is accomplished by applying the electron beam to the portions to be removed. The material can be selectively removed at widths that can be kept even smaller than ½ mil. Thereafter, the remaining conductivity determining material can be alloyed to the semiconductive substrate to produce a junction or ohmic contact as desired.

The effect of metal migration, or balling up, from a surface of a semiconductive body is accomplished according to our discoveries by applying the electron beam on the material to be removed at a power sufficient to raise the temperature of that material to within the range extending from its melting point to the eutectic point of the metal-semiconductor system. Thus, the material is melted without alloying to the substrate and this is accomplished at a power low enough to prevent the beam from deleteriously affecting the semiconductor body.

An electron beam will heat a material sufficiently whether a continuous or a pulsed beam is used. The beam may be held steady and the object, i.e., the coated semiconductor, moved relative to it, or the beam can be scanned over the surface of the object. There are a plurality of variables in electron beam operation such as accelerating voltage, current density, beam diameter and the like, as is apparent to those skilled in the art. For a pulsed beam, it is preferable, in securing reproducible results and standardizing the procedure, to vary only the pulse length and to maintain the other variables constant. In that fashion, the heating time needed to attain the desired temperature will be determined by the length of the pulses used. When a continuous beam is used, it is preferred to keep all variables constant and control the heating time by the scanning speed relative to the object surface. By operations in this fashion, satisfactory control of the process permitting fine regulation results. Generally, we prefer to use a pulsed beam operated at conditions within the following ranges: accelerating voltage, 70–90 kv.; current, 1 to 2 milliamps; pulse length, 2.5 to 12 microseconds; pulse frequency, 500 to 3000 c.p.s. (cycles per second). It should be appreciated, however, that other conditions of beam operation can be used as long as the temperature condition hereinabove mentioned is obtained.

Several parameters must be kept under control in order to achieve useful configurations. First of all, as noted earlier, the power delivered by the electron beam must be sufficient to melt the metal film but not sufficient to melt the underlying semiconductor or to raise the temperature of metal above the semiconductor-metal eutectic temperature. Second, the width ($w$) of the melted region must be adjusted relative to the thickness ($t$) of the metal layer on the surface of the semiconductive body. If the ratio of $w/t$ is too large, the melted metal does not pull away to the edges of the unmelted region, but breaks up into many isolated island-filaments of metal. It has been found experimentally that it is possible to obtain either (1) complete pulling away of molten metal to the sides, (2) formation of a single continuous alloyed area down the center of the melted strip or (3) a discontinuous filament of molten metal depending on the ratio of $w/t$. In all instances, this ratio should not exceed 150, and preferably should not exceed 75. In general, the ratio that should be used is the largest possible that will not result in isolated islands of metal, and is generally in the range of about 1 to 50.

Any semiconductive material can be used in practicing the invention. Thus, by way of example, a wafer or a dendrite (or part thereof) of silicon or germanium and which can be either p or n type semiconductivity, can be used. Methods of preparing such materials are now well known in the art and are described in patents and technical literature to which reference can be made. The actual semiconductor used, as well as its type of semiconductivity, its resistivity and size all are design considerations determined largely by the result or device that is to be prepared.

The metal or semiconductivity determining material can be applied to the surface of the semiconductor body for purposes of this invention by evaporation, plating or any other suitable technique known to those skilled in the art.

Preferred practices of the invention are those in which indium is used with n-type germanium, and aluminum is used with n-type silicon and they are applied by conventional evaporation techniques. Other acceptor or donor impurities could be used as well and, of course, they can be disposed in carrier metals, such as gold or tin when necessary or desirable. The layer of evaporated metal generally is provided by heating a crucible containing it to a temperature sufficient to provide a substantial vapor pressure thereof in a furnace also containing the semiconductor body. The semiconductor body is maintained at a temperature below that of the vaporized conductivity determinintg material so that vapor will deposit on the semiconductor. Suitably an evaporated layer ranging from about ½ micron to one or more mils thick can be used.

Figure 2:
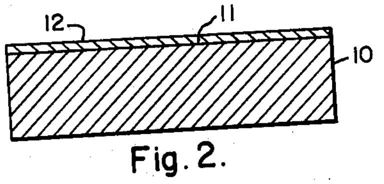
FIGS. 2 to 4 are side views in cross-section of the semiconductor body of FIG. 1 being processed in accordance with the teachings of this invention.

With reference to FIG. 1, there is illustrated a single crystal silicon wafer 10 that may be intrinsic or of p- or n-type semiconductivity, depending on the device to be prepared. The wafer 10 has an upper surface 11. With reference to FIG. 2, a layer of a suitable metal 12 is applied to the upper surface 11 of the wafer 10 by vapor deposition or any other suitable means known to those skilled in the art.

Figure 3:
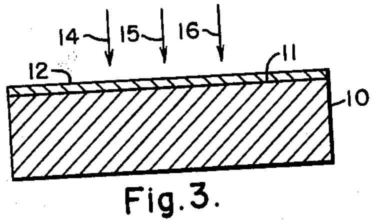
Figure 4:
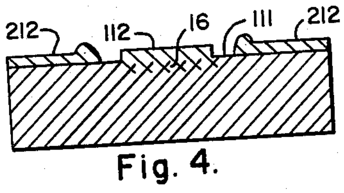

With reference to FIG. 3 the resulting body is then exposed to electron beams 14, 15, and 16. The electron beam 15 may have a higher energy capacity and thus produce more heat than beams 14 and 16. With reference to FIG. 4 as a result of the electron bombardment the layer 12 is divided into a central section 112 that is spaced from the remaining portions of layer 12 and a portion 111 of surface 11 is exposed. The exposure portion 111 of surface 11 separates section 112 from the remainder of the layer of metal 12.

As a result of the higher energy of beam 15 or by thereafter increasing the energy of beam 15 the section 112 alloys with the semiconductor wafer 10, resulting in the formation of p-n junction 16 in the wafer 10. The central section 112 is isolated by the exposed surface 111 of the semiconductive wafer 10 from the remaining portion 212 of the layer 12.

Figure 5:
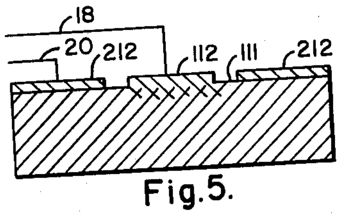
FIG. 5 is a side view in cross-section of a semiconductor device prepared in accordance with the teachings of this invention.

With reference to FIG. 5, by affixing electrical contacts 18 and 20 to regions 112 and 212 respectively, the structure is a diode.

Figure 6:
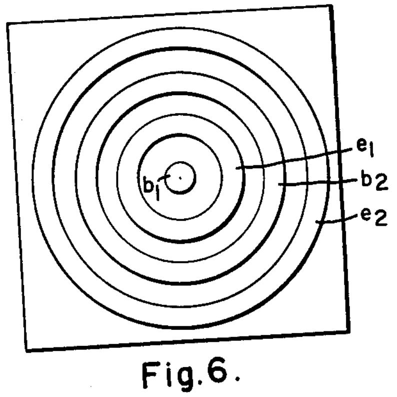
FIGS. 6 and 7 are top views of semiconductor devices prepared in accordance with the teachings of this invention.

The techniques of this invention are particularly suitable for fabricating semiconductor devices having a plurality of emitter and base contacts disposed on one surface of a wafer; such a structure is shown in FIG. 6. The emitters are denoted as (*e*) and the base contacts as (*b*).

Figure 7:
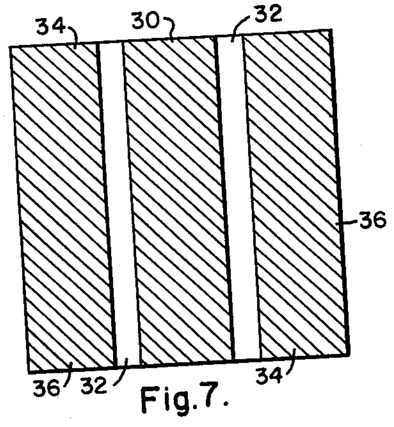

Any desired shape can be produced by this process. In one particular practice, strips of metal were produced on the surface of a semiconductive body by moving the object in a straight line while focusing the beam on its surface. The top surface of a wafer treated in that fashion is shown in FIG. 7. After the application of the electron beam, there is a central elongated strip 30 that may, but need not, be alloyed with the semiconductive wafer 32, depending on the temperature achieved. At the sides and paralleling the strip 30 are exposed portions of the wafer 32. Immediately adjacent the exposed portions are concentrations of the original metal layer, indicated as numeral 34, which is the balled metal that results in this process, and to the sides of the balled zones is the residue of the metal layer 36. Any other shape desired can be produced as well.

The invention will be described further in conjunction with the following examples in which the details are given by way of illustration and not by way of limitation.

Small strips approximately 2.5 x 0.2 x 0.05 cm. of n-type silicon having a resistivity of about 50 to 100 ohm-cm. are used. The surfaces of the silicon are cleaned by etching in an aqueous solution of hydrofluoric and nitric acids, and the samples are then promptly placed in a water-cooled quartz vacuum chamber containing a crucible of aluminum therein. After evacuation of the chamber to a pressure of about $10^{-2}$ mm. Hg, the crucible containing the aluminum is heated to 1200° C. and maintained for about one hour. The silicon is not separately heated. There results an aluminum film on each silicon body of about 0.5 to one micron in thickness.

The electron beam used was a Zeiss Electron Beam milling machine. During these runs, the characteristics of the electron beam were as follows: accelerating voltage, about 80 kv.; current, about 1.5 milliamps; pulse diameter, less than 1 mil; pulse length, 4 microseconds; pulse frequency, 2000 c.p.s.; translation speed of the specimen, one inch per minute. With these conditions, the beam is pulsed at the sample, thereby removing metal from the surface of it to define strips of deposited aluminum.

By control of the scanning, one mil widths of the evaporated aluminum were removed at spaces to allow four mil widths of the aluminum to remain. One sample was then alloyed by heating in a vacuum furnace at a pressure of $10^{-5}$ mm. Hg at 750° C. for 10 minutes. Another sample was embedded in graphite powder and then alloyed at the conditions just stated.

The samples were then compared. Alloying resulted in each instance with the graphite packed sample showing the better results, possibly due to the graphite tending to have kept the aluminum better in place during the alloying cycle. Other materials that act as a jig may be used for this purpose also. Similarly, the aluminum or other conductivity material can be oxidized, thermally or anodically, before alloying for the same purpose. By way of example, aluminum can be oxidized satisfactorily by heating in air at a temperature of 200° to 600° C. for ten minutes to an hour. When desired, as after alloying, the oxide can be removed by etching, chemical or electrolytic, with, for example, concentrated alkali, such as potassium hydroxide, or a mixture of hydrofluoric and nitric acids or other etchants.

Contacts and junctions have also been produced using other conductivity metals and semiconductive metals. The production of the localized balled zone with consequent removal of metal from selected areas is achieved, as readily as noted above, with a layer of indium on a germanium substrate upon heating, with the electron beam, to a temperature within the range of the melting point of indium to the indium-germanium eutectic temperature.

From the foregoing discussion and description, it is evident that the present invention provides a unique and easily practiced way of making p-n junctions or metal-semiconductor contacts that may be of complicated shape and of very small size. For example, spaced concentric rings, grid-like arrangements with residual areas of different sizes and the like can be obtained. As noted, this is accomplished without requiring any kind of masking. The very small zones that can be defined, both as to the material removed and allowed to remain, also make it evident that the technique is useful in providing small resistances between functional areas of a semiconductor device. By selectively protecting portions of metal deposits defined as described, some can be alloyed and others can remain unalloyed to provide contacts, junctions, and resistances or other electrical functions as desired.

While the invention has been described in detail with regard to certain materials and operating conditions, it should be understood that changes, substitutions and the like can be made without departing from its scope.

We claim:

1. A process comprising (1) affixing a metal film to a surface of a body of semiconductor material, the metal having a melting point lower than that of the semi-conductor material, (2) then scanning the surface of the metal with an electron beam at a power that raises the temperature of the metal to within the range of about the melting point of the metal and below the eutectic point of the semiconductor-metal combination, whereby the metal is removed from the surface of the semiconductive material in the localized areas scanned to define a residual area of metal of predetermined size and shape, and (3) thereafter alloying the metal in the residual area to the semiconductor body.

2. The method of claim 1 in which the body of semiconductive material is of one conductivity and the metal film is of opposite conductivity, and the alloying produces a p-n junction.

3. The method of claim 1 in which the defined residual metal is oxidized before being alloyed to the semiconductive material.

4. A method comprising (1) applying a layer of a one conductivity type metal to a surface of a body of semiconductive silicon of opposite conductivity type, (2) then heating a selected area of the metal layer with an electron beam to a temperature beyond its melting point but below the eutectic temperature of the metal-silicon system, (3) adjusting the beam to melt a width of said metal that does not exceed the thickness of the layer by a factor of 150, whereby metal is removed from the surface of the silicon where the beam has been applied, and (4) thereafter alloying the metal in the residual portion of the layer with the silicon to produce a p-n junction therein.

5. A method in accordance with claim 4 in which said metal is aluminum and is evaporated onto the surface of the silicon.

6. A method in accordance with claim 5 in which residual aluminum is alloyed to the silicon by heating the resulting body in a furnace at a temperature above the aluminum-silicon eutectic temperature.

References Cited by the Examiner

UNITED STATES PATENTS

| | | |
|---|---|---|
| 2,816,847 | 12/1957 | Shockley. |
| 2,845,371 | 7/1958 | Smith. |

FOREIGN PATENTS

| | | |
|---|---|---|
| 737,527 | 9/1955 | Great Britain. |
| 768,462 | 2/1957 | Great Britain. |

DAVID L. RECK, *Primary Examiner.*

HYLAND BIZOT, *Examiner.*

R. O. DEAN, *Assistant Examiner.*